US007689115B2

(12) United States Patent
Takahashi

(10) Patent No.: US 7,689,115 B2
(45) Date of Patent: Mar. 30, 2010

(54) CAMERA

(75) Inventor: Nobuki Takahashi, Tokyo (JP)

(73) Assignee: Nikon Corporation, Tokyo (JP)

( * ) Notice: Subject to any disclaimer, the term of this patent is extended or adjusted under 35 U.S.C. 154(b) by 168 days.

(21) Appl. No.: 11/657,582

(22) Filed: Jan. 25, 2007

(65) Prior Publication Data

US 2007/0177864 A1 Aug. 2, 2007

(30) Foreign Application Priority Data

Jan. 31, 2006 (JP) ............... 2006-022491

(51) Int. Cl.
G03B 17/18 (2006.01)
G03B 19/00 (2006.01)
G09G 5/00 (2006.01)
H04N 5/222 (2006.01)

(52) U.S. Cl. ............... 396/287; 396/50; 396/429; 345/619; 348/333.12

(58) Field of Classification Search ............... 396/287, 396/281, 288, 290, 293, 294, 429, 50; 345/619, 345/659, 629, 660, 672, 652, 655; 348/333.05, 348/333.11, 333.12
See application file for complete search history.

(56) References Cited

U.S. PATENT DOCUMENTS 5,640,627 A 6/1997 Nakano et al.

| 2003/0090495 | A1 | 5/2003 | Tomita |
| 2004/0027624 | A1 | 2/2004 | Parulski et al. |
| 2006/0140621 | A1 | 6/2006 | Misawa |
| 2007/0153110 | A1 | 7/2007 | Fujimura |
| 2007/0229695 | A1 | 10/2007 | Kato |
| 2007/0296874 | A1 | 12/2007 | Yoshimoto et al. |

FOREIGN PATENT DOCUMENTS

| JP | A 64-013128 | 1/1989 |
| JP | A 05-045711 | 2/1993 |
| JP | A 11-133403 | 5/1999 |
| JP | A 2003-208113 | 7/2003 |
| JP | A 2004-254302 | 9/2004 |
| JP | 2006-184916 | 7/2006 |
| WO | WO 2005/099248 A2 | 10/2005 |

OTHER PUBLICATIONS

U.S. Office Action mailed Oct. 7, 2009, for U.S. Appl. No. 11/727,508.

Primary Examiner—Rochelle-Ann J Blackman
(74) Attorney, Agent, or Firm—Oliff & Berridge, PLC

(57) ABSTRACT

A camera includes a display device capable of displaying on a single screen a plurality of images, each of which can be observed from one of a plurality of directions; a selection device that selects any one of a plurality of operating modes; and a display control device that displays at the display device the plurality of images each correlated to the operating mode selected via the selection device.

9 Claims, 13 Drawing Sheets

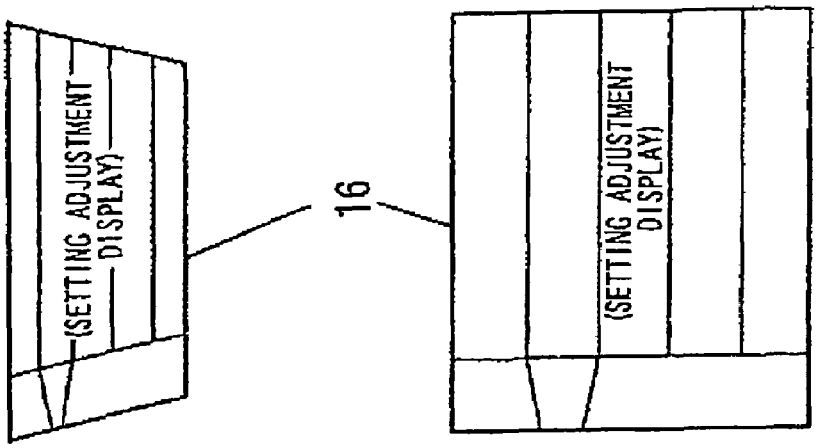
FIG.3C   CAMERA SETTING ADJUSTMENT MODE
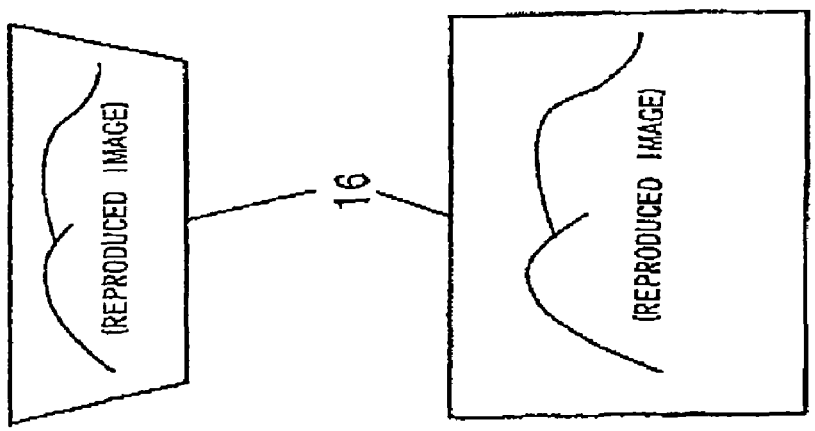
FIG.3B   IMAGE REPRODUCTION MODE
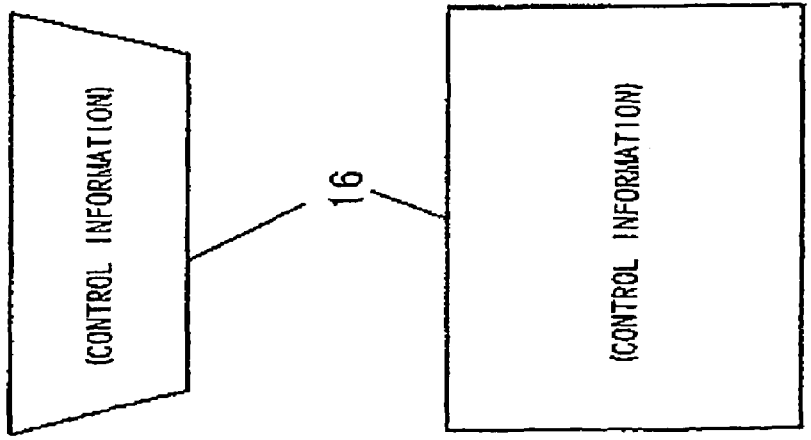
FIG.3A   PHOTOGRAPHING MODE

PHOTOGRAPHING AND
IMAGE REPRODUCTION MODE

PHOTOGRAPHING AND
CAMERA SETTING ADJUSTMENT MODE

CONTROL INFORMATION DISPLAY

CONTROL INFORMATION DISPLAY 16

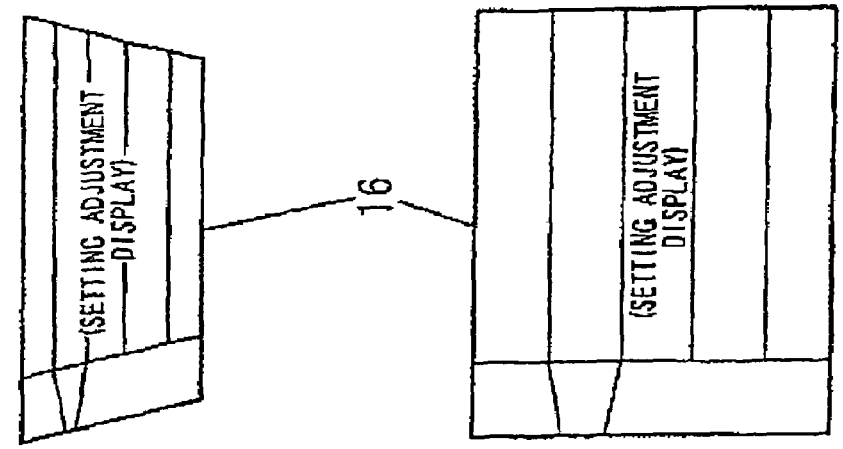
FIG.12C  CAMERA SETTING ADJUSTMENT MODE
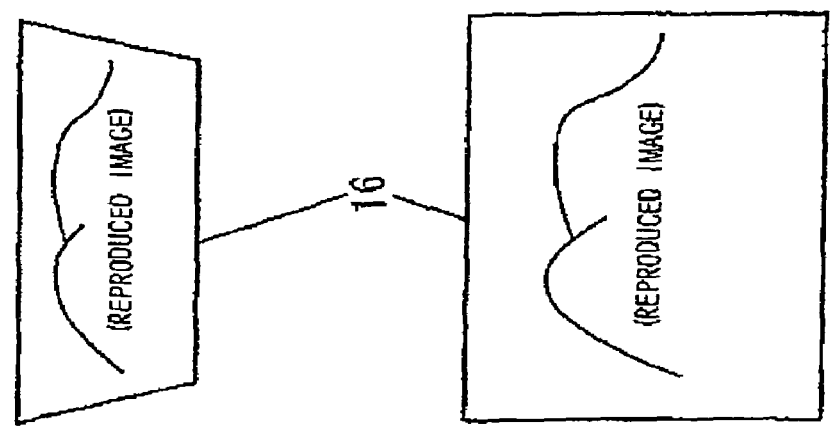
FIG.12B  IMAGE REPRODUCTION MODE
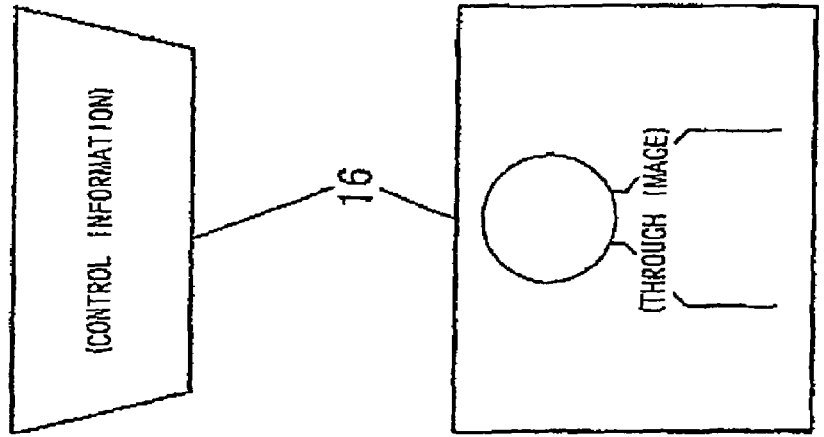
FIG.12A  PHOTOGRAPHING MODE

CAMERA

INCORPORATION BY REFERENCE

The disclosure of the following priority application is herein incorporated by reference:

Japanese Patent Application No. 2006-022491 filed Jan. 31, 2006

BACKGROUND OF THE INVENTION

1. Field of the Invention

The present invention relates to a camera.

2. Description of Related Art

Japanese Laid Open Patent Publication No. 2003-208113 discloses a technology whereby two images are formed on a single display monitor via an LCD disposed at the rear surface of a camera, which includes a diffractive optical element. A virtual second image is formed via the diffractive optical element in addition to a first image displayed at the LCD in the display device disclosed in the publication.

However, a problem arises in that the second image formed via the diffractive optical element can be observed only at a specific position and can no longer be observed once the eye position shifts.

SUMMARY OF THE INVENTION

A camera according to a first aspect of the present invention includes: a display device capable of displaying on a single screen a plurality of images, each of which can be observed from one of a plurality of directions; a selection device that selects any one of a plurality of operating modes; and a display control device that displays at the display device the plurality of images each correlated to the operating mode selected via the selection device.

The display control device may display at the display device identical images as the plurality of images.

Alternatively, the display control device may display at the display device images different from one another as the plurality of images.

The display control device may control the display device so as to keep at least one of the plurality of images in a non-display state.

The camera according to the first aspect may further include an operating member disposed at an upper surface of the camera, and it is preferable that the plurality of images displayed at the display device are observed at an upward angle relative to the display device and from a direction along a normal line to the display device.

The camera according to the first aspect may further include an operating member disposed at an upper surface of the camera, and the plurality of images displayed at the display device may be observed from at least two directions among; an upward angle relative to the display device, a direction along a normal line to the display device and a downward angle relative to the display device.

It is preferable that the display control device displays at the display device an image observed from an observing direction other than the direction extending along the normal line of sight for the display device by enlarging the image along a direction parallel to a plane that contains the direction along the normal line and the observing direction.

The display control device may increase an enlargement magnification factor for the image as a distance from an observation position increases.

The display control device may display at the display device the image in a further enlargement by ensuring that as an angle formed by the direction along the normal line and the observing direction on a display screen at the display device increases, a display magnification factor along a direction perpendicular to the plane also increases.

The camera according to the first aspect may further include a detector that detects an angle of inclination corresponding to an attitude of the camera, and the display control device may raise at least one of the enlargement magnification factor for the image along the direction parallel to the plane and the display magnification factor for the image along the direction perpendicular to the plane in correspondence to the angle of inclination detected via the detector.

BRIEF DESCRIPTION OF THE DRAWINGS

FIGS. 3A~3C present examples of display that may be brought up at an image display monitor in various operating modes, with FIG. 3A indicating an example of display contents brought up in a regular photographing mode, FIG. 3B indicating an example of display contents brought up in an image reproduction mode and FIG. 3C indicating an example of display contents brought up in a camera setting adjustment mode;

FIGS. 12A~12C present examples of display that may be brought up in a compact electronic camera, with FIG. 12A indicating an example of display contents brought up in a regular photographing mode, FIG. 12B indicating an example of display contents brought up in an image reproduction mode and FIG. 12C indicating an example of display contents brought up in a camera setting adjustment mode.

DESCRIPTION OF PREFERRED EMBODIMENTS

Figure 1:
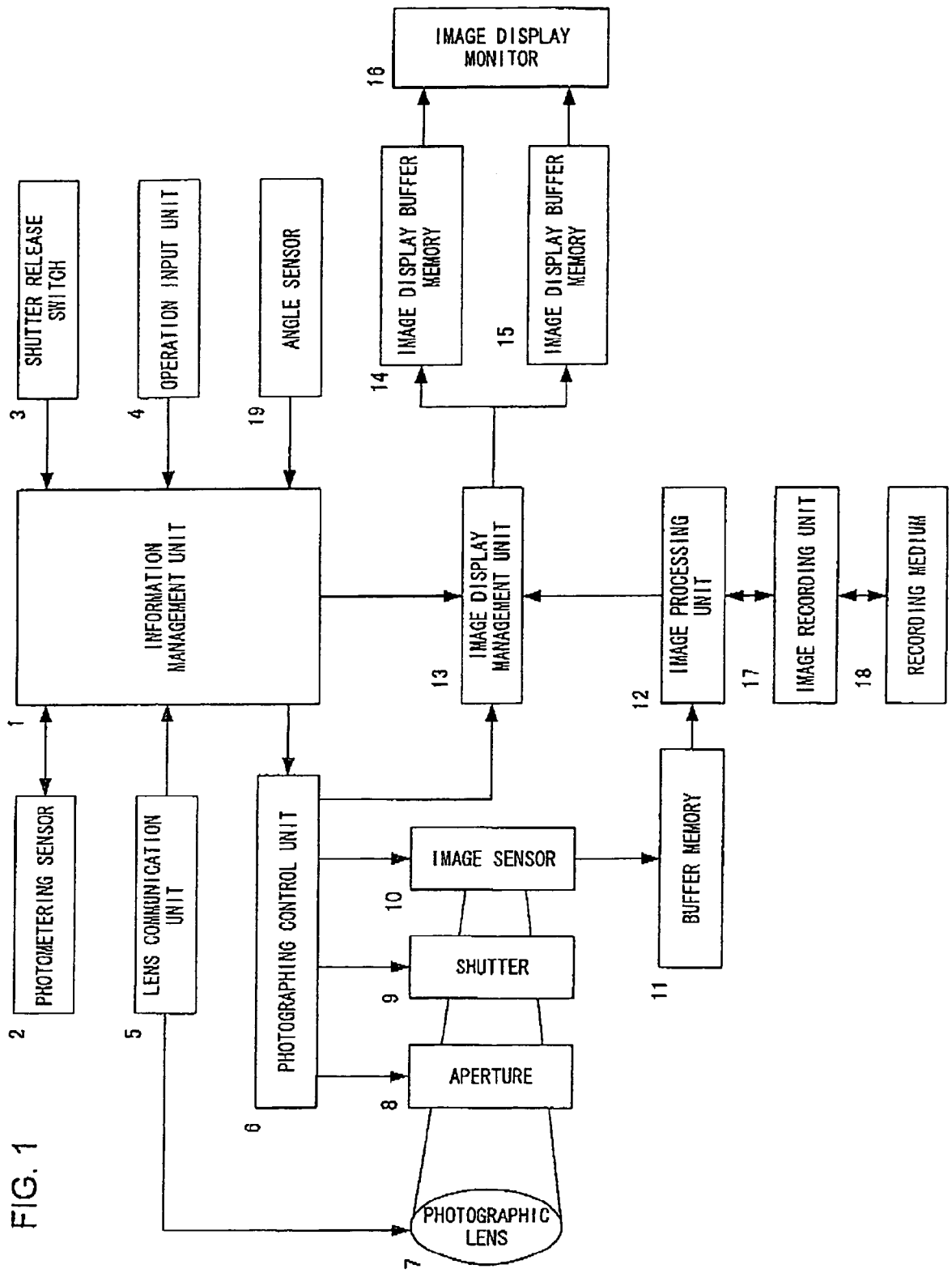
FIG. 1 is a block diagram showing the structure adopted in a camera achieved in an embodiment of the present invention.

The following is an explanation of the preferred embodiment of the present invention, given in reference to the drawings. FIG. 1 is a block diagram showing the structure adopted in a camera achieved in an embodiment of the present invention. The camera in FIG. 1, which is a single-lens reflex electronic camera, includes an information management unit 1, a photometering sensor 2, a shutter release switch 3, an operation input unit 4, a lens communication unit 5, a photographing control unit 6, a shutter 9, an image sensor 10, a buffer memory 11, an image processing unit 12, an image display management unit 13, an image display buffer memory 14, an image display buffer memory 15, an image display monitor 16, an image recording unit 17 and an angle sensor 19. A photographic lens 7, which includes an aperture 8 and a recording medium 18 can be detachably mounted at the camera.

The information management unit 1 manages information input thereto, including luminance information input from the photometering sensor 2, a shutter release instruction signal input from the shutter release switch 3, operation information input from the operation input unit 4 and information related to the photographic lens 7 (information indicating the position of the aperture 8 and the like) which is input from the lens communication unit 5. In addition, the information management unit 1 manages luminance information indicating the subject luminance, which is to be output to the photographing control unit 6, and instruction information constituting instructions for image processing and image display, and exposure correction information which are to be output to the image processing unit 12. It also generates setting adjustment display data as well.

The photometering sensor 2 measures the subject luminance through the photographic lens 7 and outputs the luminance information obtained through the measurement to the information management unit 1. The shutter release switch 3 enters an ON state by interlocking with a full press operation of a shutter release button 3a (see FIGS. 2A and 2B), which is a member operated by the user and outputs an ON signal to the information management unit 1. The ON signal from the shutter release switch 3 is equivalent to a shutter release instruction signal.

The operation input unit 4, constituted with various operating members, accepts operations for camera setting adjustment including a selection of a specific camera operating mode setting such as a regular photographing mode, a camera setting adjustment mode or an image reproduction mode and outputs a corresponding operation signal to the information management unit 1.

The photographing control unit 6 calculates control exposure by executing a specific exposure calculation based upon the luminance information obtained from the information management unit 1 and determines control parameters to be selected for the aperture 8, the shutter 9 and the image sensor 10 in order to achieve the control exposure. The photographing control unit 6 then individually controls the aperture 8, the shutter 9 and the image sensor 10 based upon the control parameters thus determined. In addition, the photographing control unit 6 generates control information display data indicating the camera conditions including the number of pictures having been taken, the F value and the shutter speed and outputs the data to the image display management unit 13.

Imaging signals output from the image sensor 10 are temporarily saved into the buffer memory 11 and the saved data are then transferred to the image processing unit 12. The image processing unit 12 generates photographic image data by executing white balance processing, pixel interpolation processing and the like on the imaging signals having been transferred thereto via the buffer memory 11 and outputs the photographic image data thus generated to the image recording unit 17. In addition, the image processing unit 12 generates image reproduction display data based upon the photographic image data having been generated or image data recorded in the recording medium 18 and outputs the image reproduction display data to the image display management unit 13.

The image recording unit 17 is capable of saving photographic image data transferred from the image processing unit 12 into the recording medium 18 and reading out data saved in the recording medium 18. The recording medium 18 may be constituted with a data storage member such as a memory card. The angle sensor 19 detects the angle of inclination of the camera, and more specifically, the extent to which the camera is tilted forward or rearward.

The image display management unit 13 manages the control information display data obtained from the photographing control unit 6, the image reproduction display data obtained from the image processing unit 12 and the setting adjustment display data obtained from the information management unit 1, and temporarily stores these data into the image display buffer memories 14 and 15 in correspondence to the camera operating mode indicated in the information obtained from the information management unit 1. It is to be noted that when storing the control information display data obtained from the photographing control unit 6 into the image display buffer memory 15, the image display management unit 13 may convert the display contents to be brought up at the image display monitor 16 so as to present them in a vertically elongated format and may store the control information display data resulting from the conversion into the image display buffer memory 15.

At the image display monitor 16 located at, for instance, the rear surface of the camera, a photographed image, a reproduced image, a camera setting adjustment screen, control information and the like is displayed. At the image display monitor 16, a plurality of different images can be displayed simultaneously and the display of each image can only be observed from a specific direction different from the directions from which other images can be observed. For instance, different images can be displayed each in correspondence to one of a plurality of observers on a liquid crystal display device by using a liquid crystal display panel and a parallax barrier in combination. By disposing the parallax barrier in a specific arrangement, three or more different images can be brought up or different images can be brought up along the vertical direction.

Figure 2A:
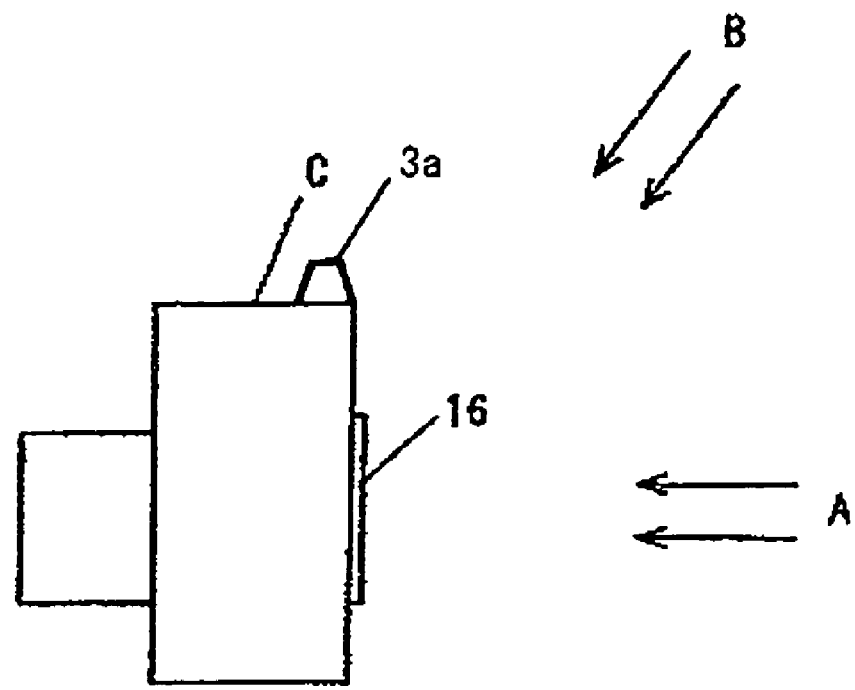
FIGS. 2A and 2B illustrate how the display may be observed, with FIG. 2A showing a camera body held upright and FIG. 2B showing the camera body held at a tilt.
Figure 2B:
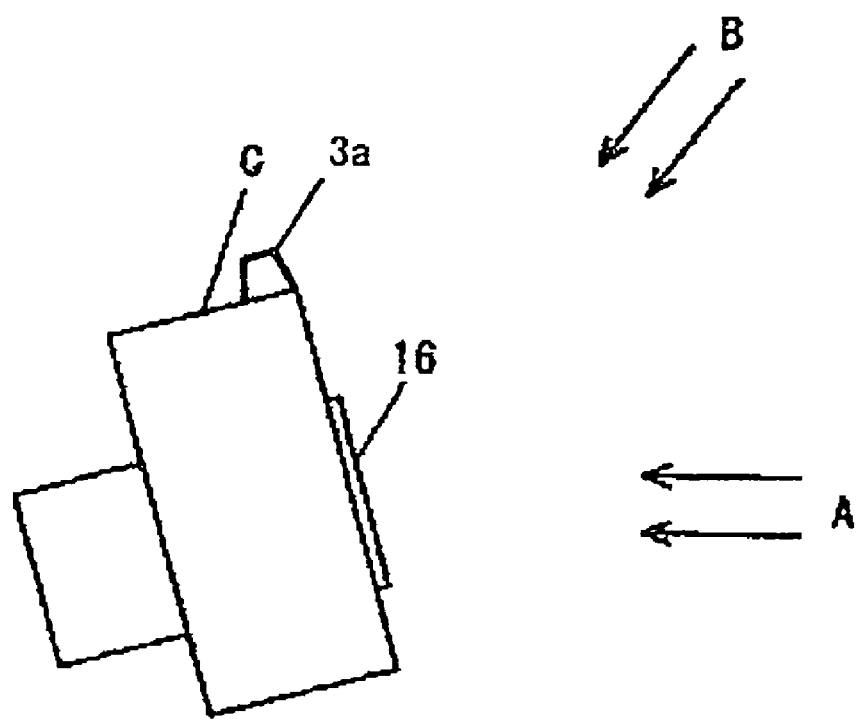

At the image display monitor 16 achieved in the embodiment, two screens can be simultaneously brought up, each to be viewed from a position assumed along the top/bottom direction. An image display that can be observed only straight-on at the rear side of the camera, as indicated by the arrows A in FIGS. 2A and 2B, is to be referred to as a straight-on observation image, whereas an image display that can be observed only at an upward-angle at the camera rear side as indicated by the arrows B in FIGS. 2A and 2B, is to be referred to as an upward-angle, observation image. The straight-on observation image is displayed by using display information stored in the image display buffer memory 14 and the upward-angle observation image is displayed by using display information stored in the image display buffer memory 15.

It is to be noted that FIG. 2A shows observation of the display on the camera with the camera body C held upright, whereas FIG. 2B shows observation of the display with the camera body C held at a tilt for better viewing. It is assumed that the display is observed on the camera rear side even when the camera body C is held at a tilt, as shown in FIG. 2B. It is also to be noted that when observing the display on the camera rear side with the camera body C held upright, as shown in FIG. 2A, the respective images can be more easily observed straight-on and at the upward angle by setting the liquid crystal display screen (not shown) constituting the image display monitor 16 at a slight upward tilt, e.g., by mechanically tilting the liquid crystal display screen. It is desirable that the angle formed by the normal line of the image display monitor 16 and the straight-on direction (the direction indicated by the arrows A) and the angle formed by the normal line and the upward-angle direction (the direction indicated by the arrows B) be equal to each other under such circumstances.

It is to be noted that three or more directions may be set as the observing directions instead of the two directions, i.e., the directions indicated by the arrows A and B. In addition, images different from one another may be displayed in correspondence to the three or more observing directions, or identical images may be displayed in correspondence to at least two of the observing directions. The three different observing directions may be, for instance, an upward-angle direction (corresponding to the direction indicated by the arrows B), a straight-on direction (corresponding to the direction indicated by the arrows A) and a downward-angle direction (corresponding to the direction along which the display is viewed from the bottom side of the camera).

It is to be noted that since operating members such as the shutter release button 3a are disposed at the camera top surface, as shown in FIGS. 2A and 2B, better ease of use is assured by observing the image display monitor 16 from the top side of the camera (from the direction indicated by the arrows B) when operating the operating members. In addition, if the operating members disposed at the top surface of the camera include a mode selector button, a mode setting image should be displayed in the upward-angle observation image screen observed at the upward-angle (from the direction indicated by the arrows B). Namely, the contents of the information displayed in the upward-angle observation image may be adjusted in correspondence to the positions at which specific operating members are disposed at the camera.

In the camera achieved in the embodiment, the display mode at the image display monitor 16 is switched in correspondence to the camera operating mode so as to provide an optimal display corresponding to the particular operating mode. Next, an example of a relationship between the camera operating mode and the display mode is explained. The operating modes that may be selected in the embodiment include a "photographing mode" in which a regular photographing operation can be executed, an "image reproduction mode" for reproducing and displaying a previously photographed image at the image display monitor 16, a "camera setting adjustment mode", in which a camera setting condition is adjusted, a "photographing and image reproduction mode" in which a reproduced image can be displayed at the image display monitor 16 while sustaining a photographing-enabled state, and a "photographing and camera setting adjustment mode" in which a camera setting adjustment display is brought up at the image display monitor 16 while sustaining a photographing-enabled state.

In the photographing and image reproduction mode, a previously photographed image can be reproduced and displayed at the image display monitor 16 by, for instance, operating the operation input unit 4 while sustaining a state in which an image can be photographed in response to a shutter release operation at any time. The photographing and camera setting adjustment mode allows the user to adjust a camera setting condition by viewing a camera setting adjustment display and operating the operation input unit 4 while sustaining the state in which an image can be photographed in response to a shutter release operation at any time.

Figure 4A:
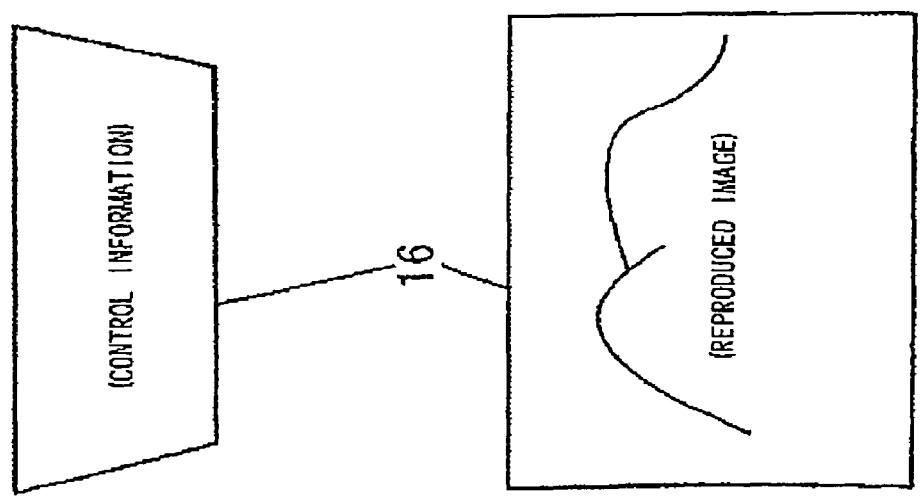
FIGS. 4A and 4B present examples of display that may be brought up at the image display monitor in various operating modes, with FIG. 4A indicating an example of display contents brought up in a photographing and image reproduction mode and FIG. 4B indicating an example of display contents brought up in a photographing and camera setting adjustment mode.
Figure 4B:
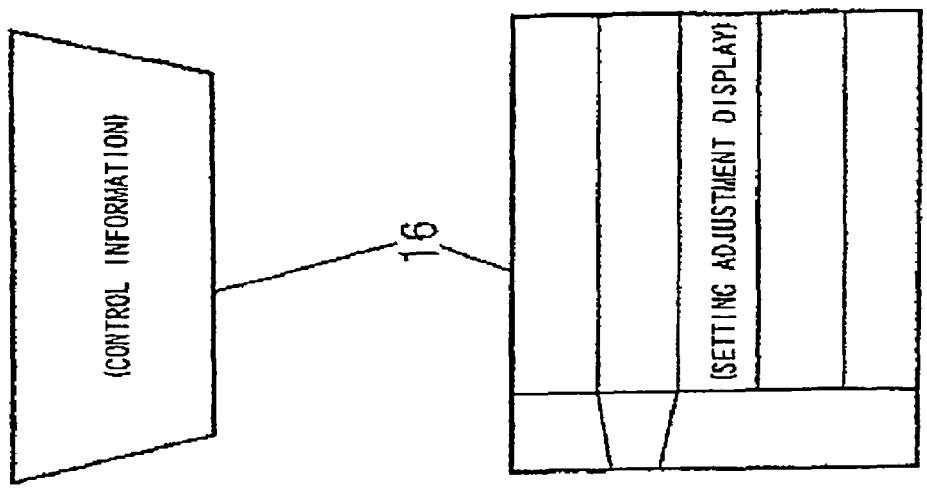

FIGS. 3A~4B present examples of displays that may be brought up at the image display monitor 16 in the various operating modes. FIGS. 3A~3C present examples of displays brought up in the photographing mode, the image reproduction mode and the camera setting adjustment mode, whereas FIGS. 4A and 4B present examples of displays brought up in the photographing and image reproduction mode and the photographing and camera setting adjustment mode. In each example, the upward-angle observation image observed by viewing the image display monitor 16 at the upward-angle is shown on the top side and the straight-on observation image is shown on the bottom side. It is to be noted that when observing the upward-angle observation image at the upward angle, the shape of the image display monitor 16 viewed at an angle from above is an inverted trapezoid.

As shown in FIG. 3A, the control information indicating the shutter speed, the aperture value, the exposure mode and the like is displayed both as the straight-on observation image and as the upward-angle observation image in the photographing mode. In the image reproduction mode, a reproduced image is displayed both as the straight-on observation image and as the upward-angle observation image, as shown in FIG. 3B. In the camera setting adjustment mode, the setting adjustment display image is displayed both as the straight-on observation image and as the upward-angle observation image, as shown in FIG. 3C. In the example presented in FIG. 3C, a menu screen in which photographing conditions can be set is displayed. It is to be noted that in the operating modes in which display images providing identical display information are displayed as the two observation images, as shown in FIGS. 3A~3C, one of the observation images may be set in a non-display state as detailed later.

In the photographing and image reproduction mode, a reproduced image is displayed as the straight-on observation image and the control information mentioned earlier is displayed as the upward-angle observation image, as shown in FIG. 4A. It is to be noted that the control information may be displayed as the straight-on observation image and the reproduced image may be displayed as the upward-angle observation image, instead. In the photographing and camera setting adjustment mode, the setting adjustment display image is displayed as the straight-on observation image and the control information is displayed as the upward-angle observation image, as shown in FIG. 4B. In this mode, too, the control information may be displayed as the straight-on observation image and the setting adjustment display image may be displayed as the upward-angle observation image, instead.

(Main Processing)

Figure 5:
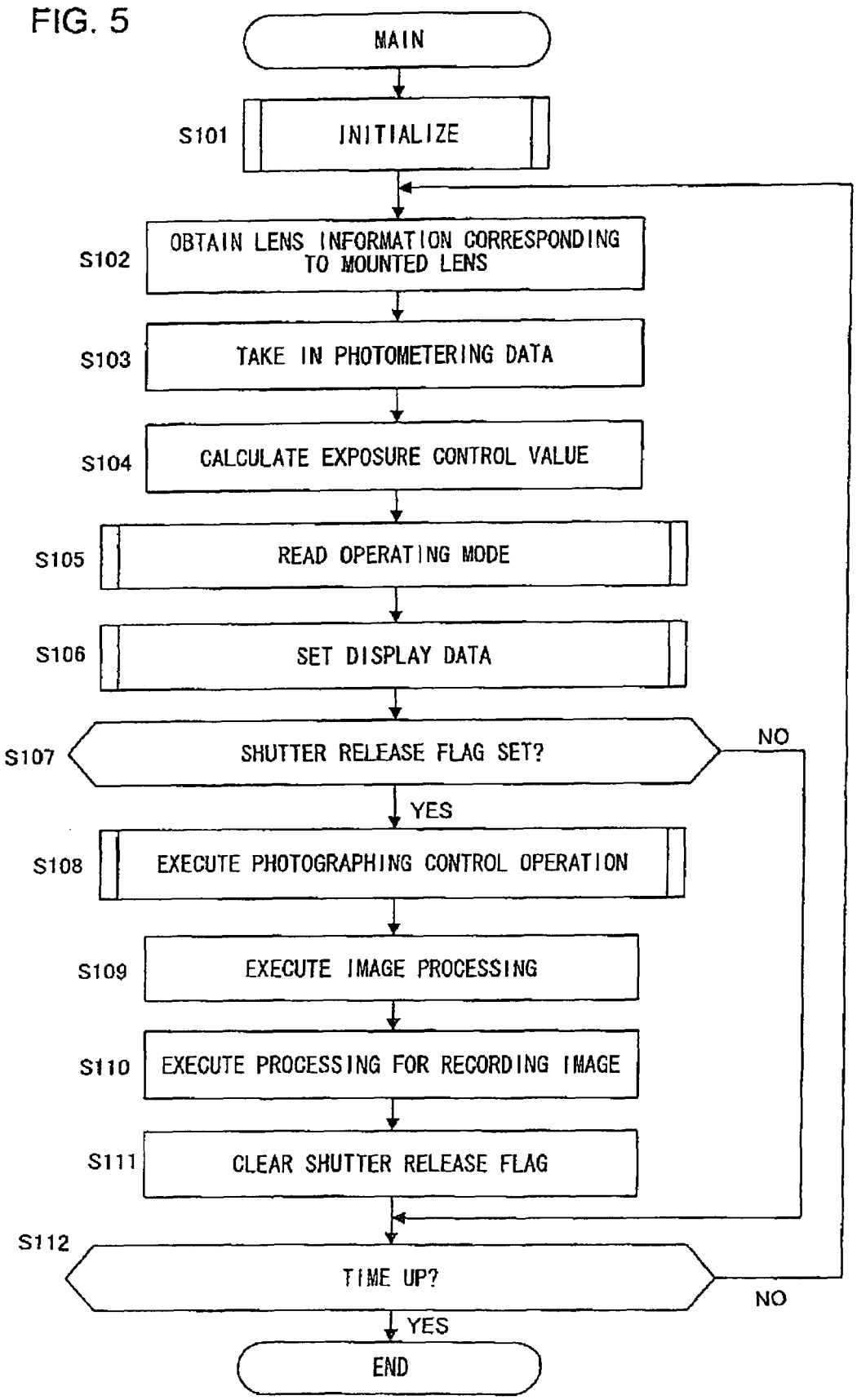
FIG. 5 presents a flowchart of the main processing executed during camera operation.

FIG. 5 presents a flowchart of the camera operation executed in the embodiment. The program for the main processing in the flowchart presented in FIG. 5 is started up as a halfway press operation signal generated as a result of a halfway press operation of the shutter release button 3a is input to the information management unit 1 while a main switch (not shown) at the camera is in an ON state. The processing in FIG. 5 ends as the main switch is turned off or as a time-up occurs at a timer counting the length of time elapsing following the input of the halfway press operation signal.

It is to be noted that since this embodiment is characterized by the relationship between the operating mode and the display mode, the following explanation focuses on the aspect of the invention related to the display mode assumed as a specific operating mode is selected.

In step S101 in the main processing shown in FIG. 5, the information management unit 1 initializes the information in the camera and then the operation proceeds to step S102. More specifically, it sets a photographing mode flag and clears a reproduction mode flag and a setting mode flag. In other words, the camera is set in the photographing mode in the initial state.

In step S102, the information management unit 1 obtains the information related to the photographic lens 7 from the lens communication unit 5 and then the operation proceeds to step S103. In step S103, the information management unit 1 takes in the luminance information from the photometering sensor 2, and then the operation proceeds to step S104. In step S104, the information management unit 1 calculates an exposure control value based upon the luminance information having been taken in step S103.

In step S105, the information management unit 1 reads the operating mode setting input via the operation input unit 4 and executes operating mode flag set processing accordingly. The operating mode flag set processing is to be described in detail later. In step S106, display data are set in the image buffer memories 14 and 15 in correspondence to the operating mode flag setting having been selected in step S105. It is to be noted that the display data set processing is to be described in detail later.

In step S107, the information management unit 1 makes a decision as to whether or not a shutter release operation has been executed by checking a shutter release flag which is set in response to a shutter release instruction signal from the shutter release switch 3. It the shutter release flag has been set, an affirmative decision is made in step S107 to proceed to step S108, whereas a negative decision is made in step S107 if the shutter release flag has not been set, and in this case, the operation proceeds to step S112.

In step S108, the information management unit 1 executes photographing control processing, and then the operation proceeds to step S109. The photographing control processing is to be described in detail later. In step S109, the information management unit 1 outputs an instruction for the image processing unit 12 so as to generate image data by executing a specific type of image processing on image signals stored in the buffer memory 11. In step S110, the image data having been generated in step S109 are written into the recording medium 18.

In step S111, the shutter release flag is cleared in preparation for the next shutter release operation. In step S112, the information management unit 1 makes a decision as to whether or not a time-up has occurred at the timer. The information management unit 1 makes an affirmative decision in step S112 thereby ending the main processing in FIG. 5, if a predetermined length of time has elapsed following the input of the halfway press operation signal and a time-up has occurred. If, on the other hand, a time-up has not occurred at the timer, the information management unit 1 makes a negative decision in step S112 and, in this case, the operation returns to step S102 to repeatedly execute the processing described above.

(Photographing Control Operation Processing)

Figure 6:
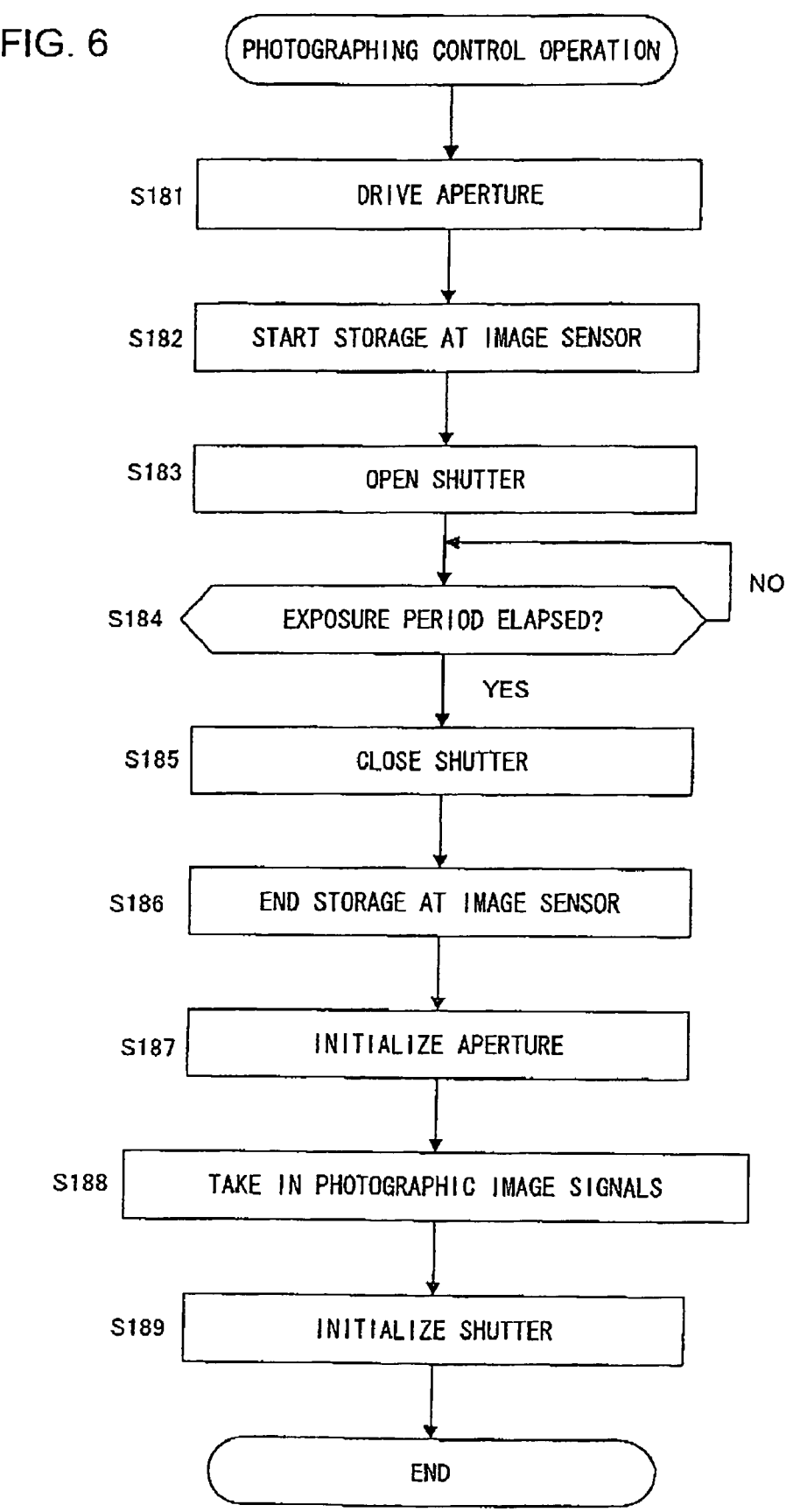
FIG. 6 presents a detailed flowchart of the photographing control operation processing.

Next, the photographing control operation processing executed in step S108 is explained in detail in reference to the flowchart presented in FIG. 6. In step S181 in FIG. 6, the information management unit 1 outputs an instruction for the photographing control unit 6 so as to set the aperture 8 to the position corresponding to the control aperture value, and then the operation proceeds to step S182. In step S182, the information management unit 1 outputs an instruction for the photographing control unit 6 so as to start an electrical charge storage at the image sensor 10, and then the operation proceeds to step S183.

In step S183, the information management unit 1 outputs an instruction for the photographing control unit 6 to start exposure by opening the shutter 9 and then the operation proceeds to step S184. In step S184, the information management unit 1 makes a decision as to whether or not the exposure period, the length of which corresponds to the control shutter speed, has elapsed. If the exposure period has elapsed, the information management unit 1 makes an affirmative decision in step S184 to proceed to step S185, whereas it makes a negative decision in step S184 if the exposure period has not elapsed. In the latter case, the decision-making processing is executed repeatedly.

In step S185, the information management unit 1 outputs an instruction for the photographing control unit 6 so as to end the exposure by closing the shutter 9 before the operation proceeds to step S186. In step S186, the information management unit 1 outputs an instruction for the photographing control unit 6 so as to end the electrical charge storage at the image sensor 10, and then the operation proceeds to step S187. In step S187, the information management unit 1 outputs an instruction for the photographing control unit 6 so as to reset the aperture 8 to the initial position before proceeding to step S188.

In step S188, the information management unit 1 outputs an instruction for the photographing control unit 6 so as to start taking in charge storage signals (image signals) from the image sensor 10 and then the operation proceeds to step S189. The image signals are then stored into the buffer memory 11. In step S189, the information management unit 1 outputs an instruction for the photographing control unit 6 so as to initialize the shutter 9 and then the processing in FIG. 6 ends.

(Operating Mode Read/Flag Set Processing)

Figure 7:
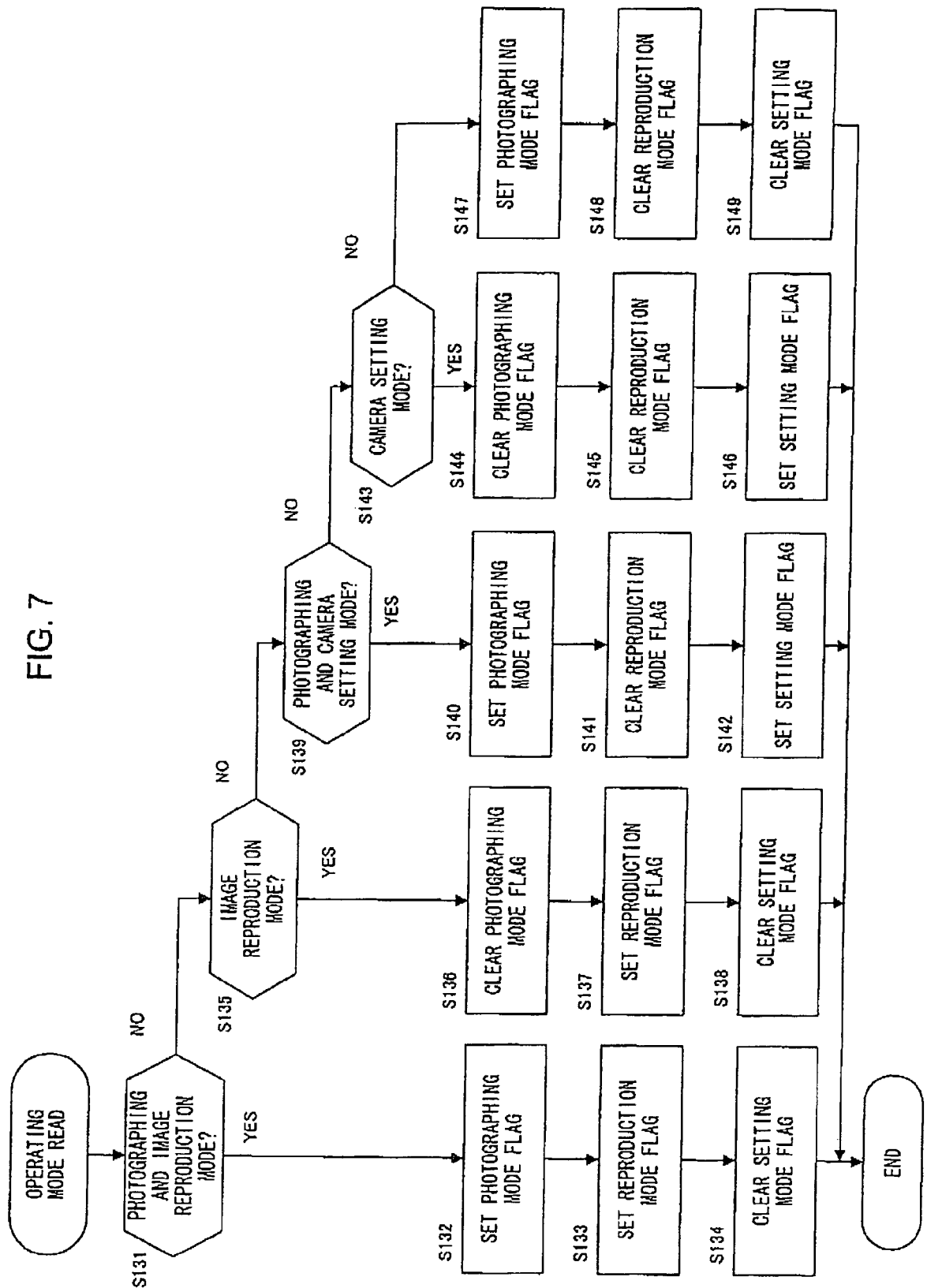
FIG. 7 presents a detailed flowchart of the processing for reading the operating mode setting and the processing for setting the operating mode flag.

The operating mode setting read processing and the operating mode flag set processing executed in step S105 as described earlier are now explained in detail in reference to the flowchart presented in FIG. 7. In step S131, the information management unit 1 makes a decision as to whether or not the operating mode setting read from the operation input unit 4 indicates the photographing and image reproduction mode. If the operating mode setting indicates the photographing and image reproduction mode, the information management unit 1 makes an affirmative decision to proceed to step S132, whereas if the operating mode setting indicates any other operating mode, it makes a negative decision to proceed to step S135.

In step S132, to which the operation proceeds from step S131 when the operating mode setting indicates the photographing and image reproduction mode, the photographing mode flag is set, and then in step S133, the reproduction mode flag is set. Subsequently, the operation proceeds to step S134 to clear the setting mode flag and the processing in FIG. 7 then ends.

If, on the other hand, the operation proceeds from step S131 to step S135, a decision is made in step S135 as to whether or not the operating mode setting having been read indicates the image reproduction mode. The information management unit 1 makes an affirmative decision if the operating mode setting indicates the image reproduction mode to proceed to step S136, but it makes a negative decision if the operating mode setting indicates any other operating mode to proceed to step S139.

In step S136, to which the operation proceeds from step S135 when the operating mode setting indicates the image reproduction mode, the photographing mode flag is cleared, and then in step S137, the reproduction mode flag is set. Subsequently, the operation proceeds to step S138 to clear the setting mode flag and the processing in FIG. 7 then ends.

If the operation proceeds to step S139 upon making a negative decision in step S135, a decision is made in step S139 as to whether or not the operating mode setting having been read indicates the photographing and camera setting mode. The information management unit 1 makes an affirmative decision if the operating mode setting indicates the photographing and camera setting mode to proceed to step S140, but it makes a negative decision if the operating mode setting indicates any other operating mode to proceed to step S143.

In step S140, to which the operation proceeds from step S139 when the operating mode setting indicates the photographing and camera setting mode, the photographing mode flag is set and then the reproduction mode flag is cleared in step S141. Subsequently, the operation proceeds to step S142 to set the setting mode flag and then the processing in FIG. 7 ends.

If the operation proceeds to step S143 upon making a negative decision in step S139, a decision is made in step S143 as to whether or not the operating mode setting having been read indicates the camera setting mode. The information management unit 1 makes an affirmative decision if the operating mode setting indicates the camera setting mode to proceed to step S144, but it makes a negative decision if the operating mode setting indicates any other operating mode to proceed to step S147.

In step S144, to which the operation proceeds from step S143 when the operating mode setting indicates the camera setting mode, the photographing mode flag is cleared and then the reproduction mode flag is also cleared in step S145. Subsequently, the operation proceeds to step S146 to set the setting mode flag, and then the processing in FIG. 7 ends.

If, on the other hand, a negative decision is made in step S143 and the operation proceeds to step S147, i.e., when the operating mode setting indicates the photographing mode, the photographing mode flag is set in step S147, and then the reproduction mode flag is cleared in step S148. Subsequently, the operation proceeds to step S149 to clear the setting mode flag, before ending the processing in FIG. 7.

(Display Data Set Processing)

Figure 8:
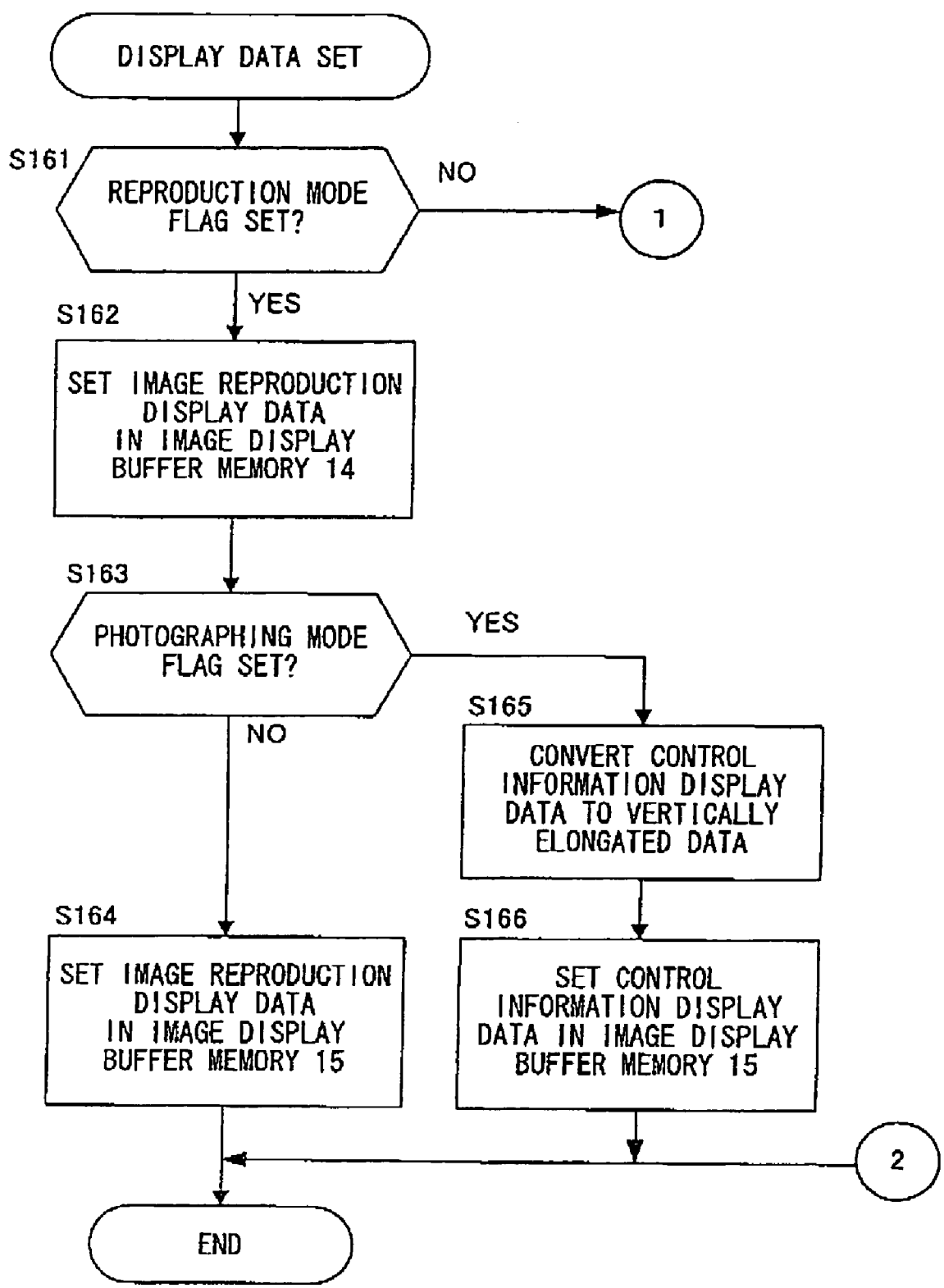
FIG. 8 presents a detailed flowchart of the display data set processing.
Figure 9:
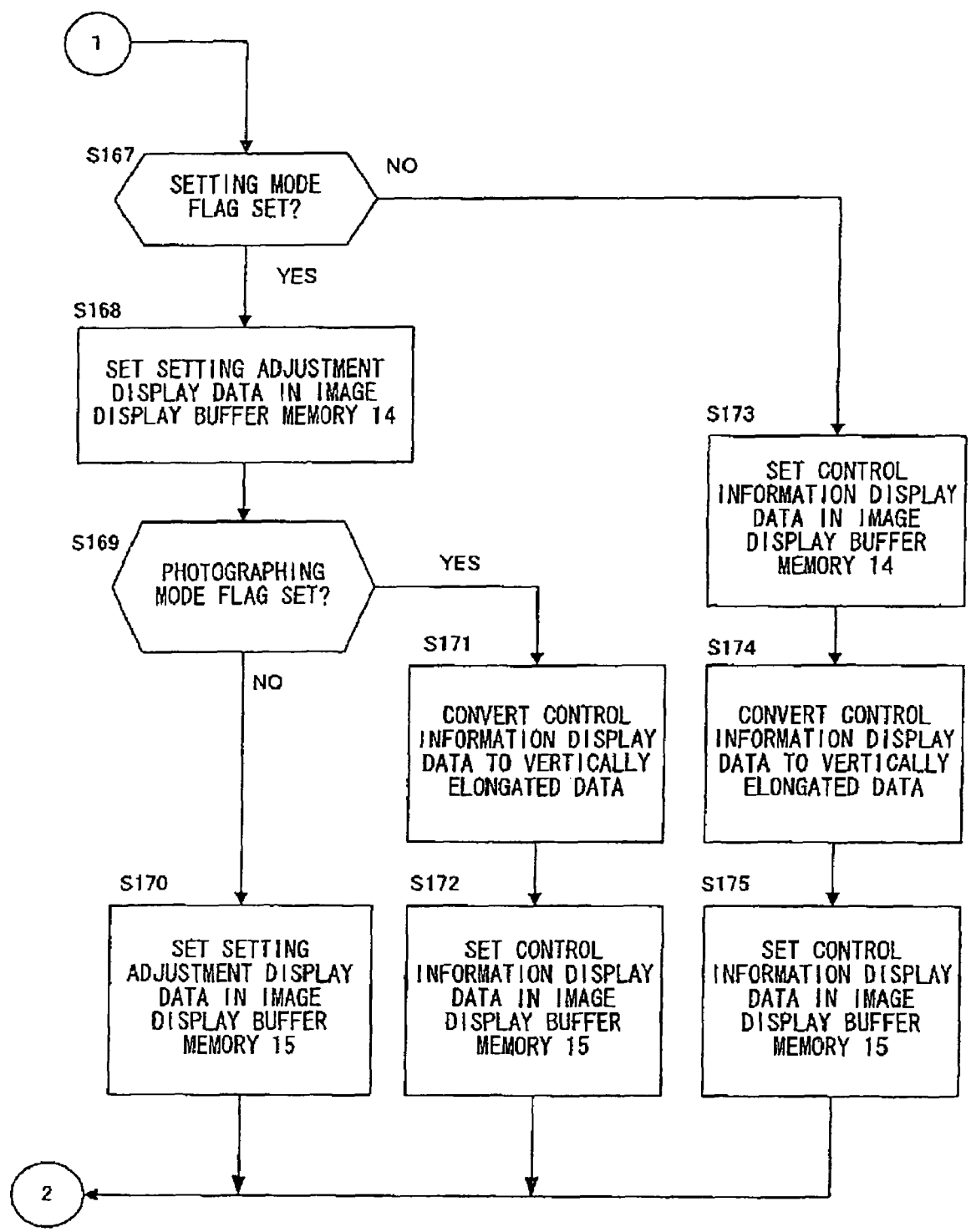
FIG. 9 presents a detailed flowchart of the displayed data set processing, in continuation from FIG. 8.

The display data set processing executed in step S106 as described above is now explained in detail in reference to the flowchart presented in FIGS. 8 and 9. The image display management unit 13 in FIG. 1 executes the processing in FIGS. 8 and 9 based upon the statuses of the photographing mode flag, the reproduction mode flag and the setting mode flag set by the information management unit 1 as described above.

In step S161, the image display management unit 13 makes a decision as to whether or not the reproduction mode flag has been set. If the reproduction mode flag has been set, i.e., if the photographing and image reproduction mode or the image reproduction mode has been selected, the image display management unit 13 makes an affirmative decision to proceed to step S162, but it makes a negative decision otherwise to proceed to step S167 in FIG. 9.

The processing executed in step S162 and subsequent steps after making an affirmative decision in step S161 is first explained. In step S162, image data to be used for image reproduction are set in the image display buffer memory 14. More specifically, a specific set of image data (e.g., the set of image data having been recorded most recently) among the sets of image data recorded in the recording medium 18 is taken in and the set of image data thus taken in is set in the image display buffer memory 14 as image reproduction display data to be used as image reproduction display data for the straight-on display (straight-on observation image).

In step S163, a decision is made as to whether or not the photographing mode flag has been set, i.e., whether the photographing and image reproduction mode or the image reproduction mode has been selected. If the photographing mode flag has been set, i.e., when the photographing and image reproduction mode has been selected, the image display management unit 13 makes an affirmative decision to proceed to step S165, whereas if the photographing mode flag has not been set, i.e., when the image reproduction mode has been selected, it makes a negative decision to proceed to step S164.

In step S164, to which the operation proceeds from step S163 when the image reproduction mode has been selected, image reproduction display data identical to those set in step S162 are set in the image display buffer memory 15, and then the processing in the flowchart presented in FIGS. 8 and 9 ends. As a result, identical reproduced images are displayed as the straight-on observation image and the upward-angle observation image at the image display monitor 16.

Figure 10A:
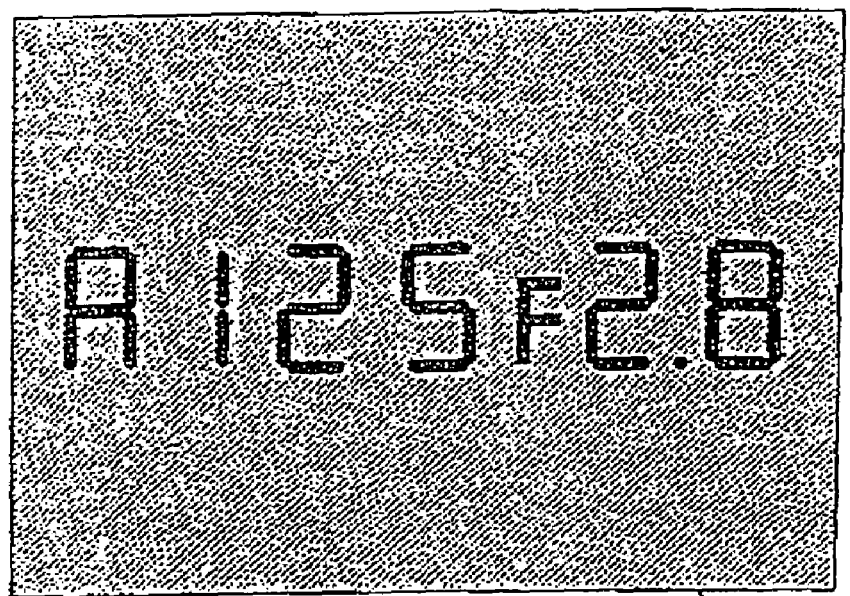
FIGS. 10A and 10B illustrate the concept of the vertically elongated display, with FIG. 10A showing a pre-elongation regular display and FIG. 10B showing a vertically elongated display.
Figure 10B:
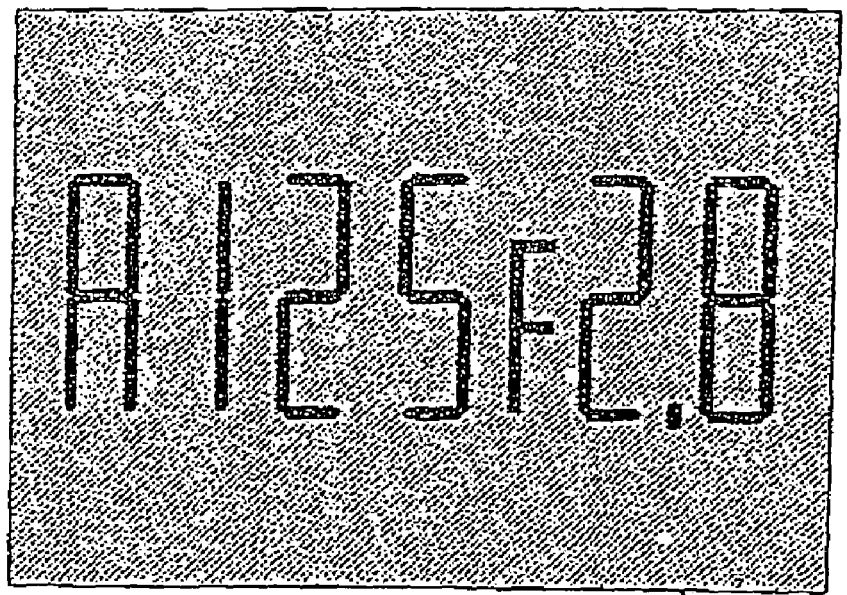

If, on the other hand, the operation proceeds from step S163 to step S165, i.e., when the photographing and image reproduction mode has been selected, the control information display data are converted to vertically elongated display data. FIG. 10A shows the regular control information display, i.e., the pre-elongation control information display, whereas FIG. 10B shows control information display brought up by using the vertically elongated display data. In step S166, the control information display data having been converted to the vertically elongated display data in step S165 are set in the image display buffer memory 15 and then the processing in the flowchart presented in FIGS. 8 and 9 ends. As a result, the reproduced image is displayed at the image display monitor 16 as the straight-on observation image, whereas the vertically elongated control information such as that shown in FIG. 10B is displayed as the upward-angle observation image at the display monitor 16.

Figure 11:
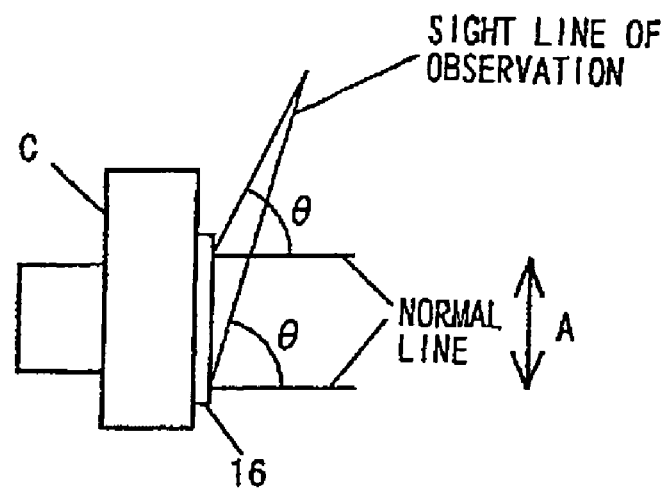
FIGS. 11A~11C illustrate observation of the display viewed from a position above the display at an angle, with FIG. 11A showing the relationship between the observation sight line and the normal line to the display surface, FIG. 11B showing the display image observed from the position above the display at an angle and FIG. 11C showing the display image having undergone trapezoidal conversion.
Figure 11:
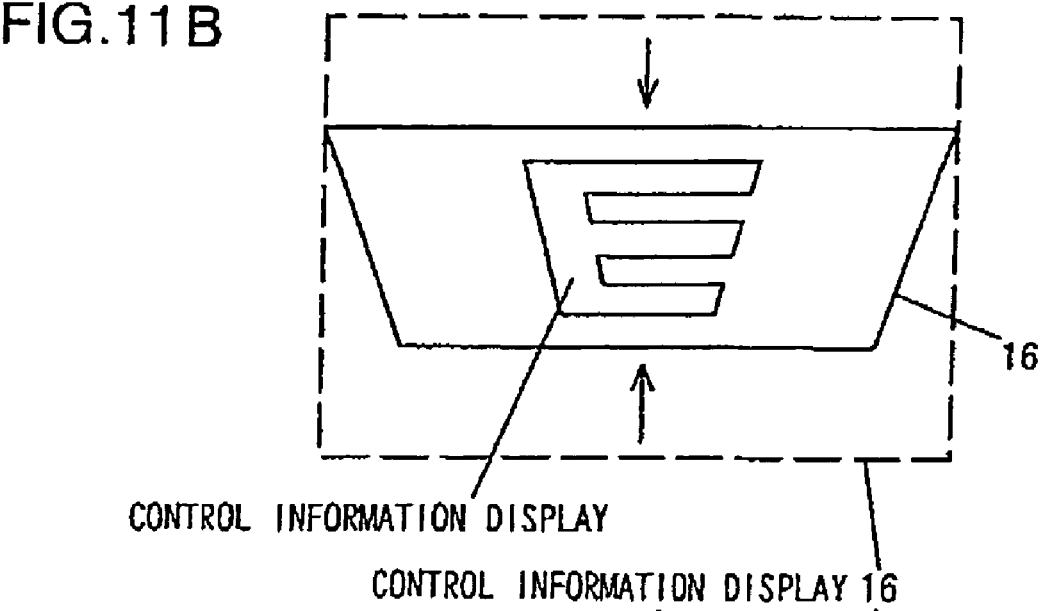
Figure 11:
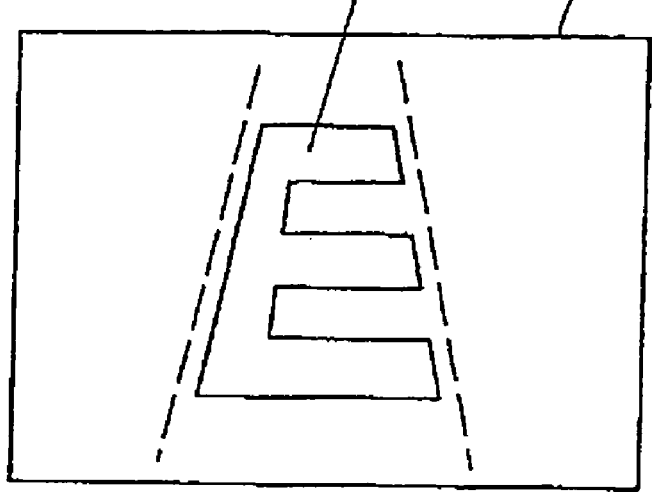

When the image display monitor 16 disposed at the rear surface of the camera body C is viewed from above at an angle, as shown in FIG. 11A, the top to bottom measurement of the image display monitor 16 becomes reduced in appearance, as shown in FIG. 11B. In other words, the measurement of the display image on the display screen appears to be reduced along a direction parallel to the plane that contains the observation line of sight and the normal line of sight for the display screen (the direction indicated by the arrow A). It is to be noted that the rectangle indicated by the dotted line in FIG. 11B indicates the outline of the image display monitor 16 viewed from straight on. Accordingly, by bringing up a vertically elongated display such as that shown in FIG. 10B so as to enlarge the display image along the direction indicated by the arrow A, it is ensured that the control information can be viewed and read with ease from above at the specific angle.

Next, the processing executed in step S167 in FIG. 9 and subsequent steps after making a negative decision in step S161, i.e., after determining that the reproduction mode flag has not been set, is explained. In step S167, a decision is made as to whether or not the setting mode flag has been set. If the reproduction mode flag has been cleared and the setting mode flag has been set, i.e., when the photographing and camera setting adjustment mode or the camera setting adjustment mode has been selected, the image display management unit 13 makes an affirmative decision in step S167 to proceed to step S168, but it makes a negative decision otherwise to proceed to step S173.

If the operation proceeds from step S167 to step S168, data for the setting adjustment display are set in the image display buffer memory 14 to be used as the straight-on observation image in step S168. In the following step S169, a decision is made as to whether or not the photographing mode flag has been set, i.e., whether the camera setting adjustment mode or the photographing and camera setting adjustment mode has been selected. If the photographing mode flag has been set, i.e., when the photographing and camera setting adjustment mode has been selected, the image display management unit 13 makes an affirmative decision to proceed to step S171, whereas if the photographing mode flag has not been set, i.e., when the camera setting adjustment mode has been selected, the image display management unit 13 makes a negative decision to proceed to step S170.

In Step S170, to which the operation proceeds from step S169 upon determining that the camera setting adjustment mode has been selected, setting adjustment display data identical to those set in step S168 are set in the image display buffer memory 15, before the processing in FIG. 8 ends. As a result, identical setting adjustment displays are brought up at the image display monitor 16 as the straight-on observation image and the upward-angle observation image.

If, on the other hand, the photographing and camera setting adjustment mode has been selected and the operation proceeds from S169 to step S171 accordingly, the control information display data are converted to vertically elongated display data. In step S172, the control information display data having been converted to the vertically elongated display data in step S171 are set in the image display buffer memory 15 and then the processing in the flowchart presented in FIGS. 8 and 9 ends. As a result, the setting adjustment display is brought up as the straight-on observation image and the vertically elongated control information such as that shown in FIG. 10B is brought up as the upward-angle observation image at the image display monitor 16.

If the operation proceeds to step S173 after making a negative decision in step S167, i.e., after determining that the setting mode flag has not been set, the photographing mode has been selected as the operating mode. Under such circumstances, the control information display data are set in the image display buffer memory 14 to be used as the straight-on observation image in step S173. Then, in step S174, the control information display data are converted to vertically elongated display data and in the following step S175, the vertically elongated control information display data are set in the image display buffer memory 15, before the processing in the flowchart presented in FIGS. 8 and 9 ends. As a result, identical control information is displayed both as the straight-on observation image and the upward-angle observation image at the image display monitor 16.

In the example described above, the control information display data are vertically elongated so as to provide the control information in a vertically elongated display, as shown in FIG. 10B when displaying the control information as the upward-angle observation image. It is to be noted that when converting the data to vertically elongated data, the magnification factor along the vertical direction may be increased as the distance from the observation position increases. Namely, the vertical magnification factor for the data of the image observed from above may be gradually increased toward the bottom of the display starting at the top of the display data. The shape of the image display monitor 16 viewed from the upward-angle, as shown in FIG. 11A, is an inverted trapezoid in appearance, as shown in FIG. 11B. Thus, the control information display, too, is observed over an image field with the top side assuming the greatest width and becoming narrower toward the bottom. In other words, the bottom side of the display screen with a larger angle θ in FIG. 11A appears to have a smaller width along the horizontal direction, (the direction extending from the front side through the back side of the drawing sheet).

Accordingly, as shown in FIG. 11C, the control information display data may be converted to data taking on a trapezoidal shape gradually widening from the top side of the display toward the bottom side of the display, i.e., the data may be converted by setting a greater display magnification along the left-right direction on the display screen in correspondence to a larger angle θ and the data resulting from this conversion may be set in the image display buffer memory 15. A display such as that shown in FIG. 11C, observed from the upward-angle retains a substantially constant lateral display width, which can be viewed with greater ease. In addition, such trapezoidal conversion may be executed in combination with the conversion to vertically elongated display data. The vertical magnification factor for the data may be increased as the distance from the observation position increases, as explained earlier. The image displayed by adopting such a display mode, which appears no different from the straight-on image, can be observed with ease from above.

In addition, the vertical elongation or the trapezoidal conversion described above may be executed in correspondence to the angle of inclination at which the camera is held, detected via the angle sensor 19 shown in FIG. 1. Namely, since the appearance of difference between the width of the top side and the width of the bottom side of the image display monitor 16 becomes more pronounced when the angle of inclination is smaller (when the camera is held at a tilt along the forward direction to a smaller extent), the extent of the vertical elongation and/or the extent to which the trapezoid widens toward the bottom, representing the lateral ratio of the displayed image, should be further increased in correspondence to a smaller angle of inclination. It is to be noted that while the control information display data resulting from the vertical elongation are set in the image display buffer memory 15 in the example described above, the vertical elongation or the trapezoidal conversion may be executed when displaying the control information at the image display monitor 16 in response to a command issued from the image display management unit 13 to a display control circuit at the image display monitor 16, instead.

In addition, when display images generated based upon identical display information are displayed as the upward-angle observation image and the straight-on observation image as in the photographing mode, the image reproduction mode and the camera setting adjustment mode shown in FIGS. 3A~3C, either one of the observation images may be set in a non-display state. For instance, an operating member operated to select the display/non-display state may be included in the operation input unit 4 shown in FIG. 1, and the observation image to be viewed from the desired direction may be brought up on display in response to an operational instruction issued by the user.

While the control information is brought up as the upward-angle display (upward-angle observation image) and the reproduced image or the setting adjustment display is brought up as the straight-on display (straight-on observation image) in the photographing and image reproduction mode and the photographing and camera setting adjustment mode shown in FIGS. 4A and 4B, the contents of the upward-angle display and the straight-on display may be reversed.

While an explanation is given above in reference to the embodiment on an example in which the present invention is adopted in a camera that allows different images brought up at the image display monitor 16 to be observed straight-on and at an upward-angle, the present invention may also be adopted in a camera that allows images to be displayed at the image display monitor 16 to be observed from three or more different directions. In addition, while an explanation is given above in reference to the embodiment on an example in which the present invention is adopted in a single-lens reflex electronic camera, the present invention may also be adopted in a compact electronic camera with an integrated lens.

In a standard compact electronic camera with an integrated lens, an image captured via the image sensor 10 is displayed as a through image at the image display monitor 16 in the regular photographing mode. Accordingly, display modes shown in FIGS. 12A~13B may be adopted instead of the display modes explained earlier in reference to FIGS. 3A~4B.

Figure 13A:
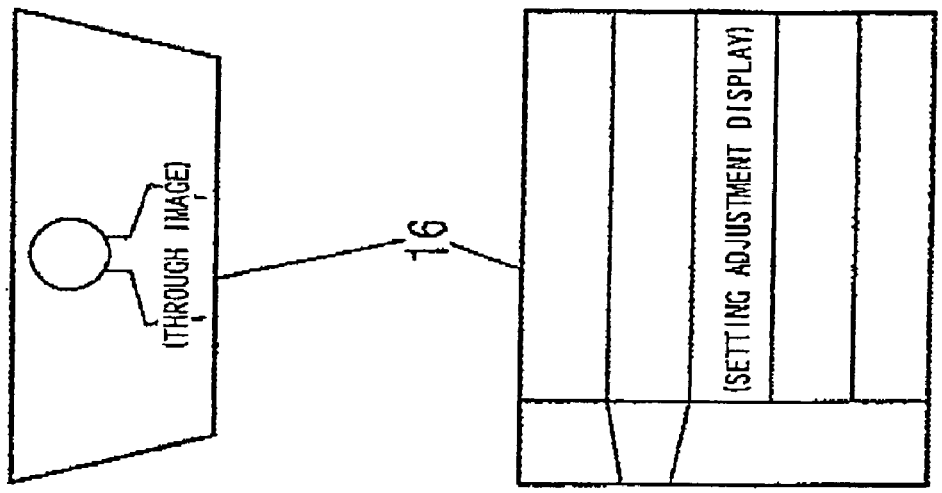
FIGS. 13A and 13B present examples of display that may be brought up in a compact electronic camera, with FIG. 13A indicating an example of display contents brought up in a photographing and image reproduction mode and FIG. 13B indicating an example of display contents brought in a photographing and camera setting adjustment mode.
Figure 13B:
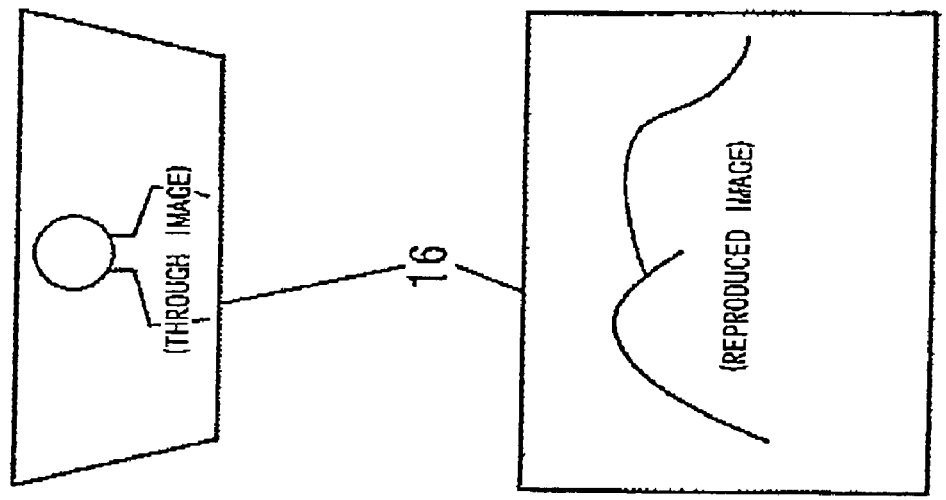

FIGS. 12A~12C present examples of displays brought up in the photographing mode, the image reproduction mode and the camera setting adjustment mode. While the display modes selected in correspondence to the image reproduction mode and the camera setting adjustment mode are identical to those shown in FIGS. 3B and 3C, the through image is displayed as the straight-on observation image in the photographing mode, as shown in FIG. 12A. FIGS. 13A and 13B present examples of displays brought up in the photographing and image reproduction mode and the photographing and camera setting adjustment mode. The through image is brought up as the upward-angle observation image in either operating mode. It is to be noted that as in the display modes in FIGS. 3A~4B, the display contents for the upward-angle observation image and the straight-on observation image may be reversed. It is also to be noted that the control information may be superimposed over the through image on display, as well.

The following operational effects can be achieved in the camera in the embodiment described above.

(1) A plurality of observation images, each of which can be observed from a specific observing direction among a plurality of observing directions, can be displayed on a single display screen at the image display monitor 16. The image display management unit 13 capable of functioning as a display control means brings up display images correlated to the specific operating mode selected via the operation input unit 4 capable of functioning as a selection means as the straight-on observation image and the upward-angle observation image. While the type of image observed at the image display monitor is determined by the observing direction, each observation image can be observed as a clear image regardless of the distance over which it is viewed, assuring better ease of observation over the prior art.

(2) In addition, in the photographing and image reproduction mode and the photographing and camera setting adjustment mode, different images are brought up as the straight-on observation image and the upward-angle observation image, which enables speedy execution of the individual operations that are concurrently underway, thereby assuring better ease of camera operation.

(3) Furthermore, since information can be displayed as each of the plurality of observation images, a greater volume of information can be provided on display. At the same time, since such information can be provided over a plurality of observation images, the volume of information per image does not need to be increased, and the information can be read with greater ease.

(4) Either of the display images brought up based upon identical display information as the straight-on observation image and the upward-angle observation image in an operating mode for executing a single operation as shown in FIGS. 3A~3C can be set in a non-display state.

(5) The display image brought up as the upward-angle observation image to be observed from above at an angle is enlarged along the vertical direction, as in the vertically elongated display shown in FIG. 10B to assure better ease in viewing the displayed image. The image displayed with an increasingly larger lateral displayed magnification factor toward the bottom side of the image, as in the display of the image having undergone the trapezoidal conversion shown in FIG. 11C can be viewed with better ease as it is observed at an upward angle. In addition, the extent of the vertical elongation or the lateral display magnification factor for the trapezoidal conversion is adjusted in correspondence to the angle of inclination indicating the camera attitude so as to provide a display that can be viewed with even greater ease.

(6) As explained above, by adopting the embodiment in which a plurality of images, each of which can be observed from one of a plurality of directions, are displayed on a single screen, a plurality of images can be observed with ease on a single monitor.

The above described embodiments are examples, and various modifications can be made without departing from the scope of the invention.

What is claimed is:

1. A camera comprising:
    a display device capable of simultaneously displaying a first image viewable from a first direction and a second image viewable from a second direction on a single screen;
    a selection device that selects any one of a plurality of operating modes; and
    a display control device that controls the display device to display a first display data and a second display data that are correlated to the operating mode selected via the selection device as the first image and the second image, respectively.

2. A camera according to claim 1, wherein:
    the display control device controls the display device to display control information display data showing a camera state, camera setting change display data displayed at the time of a camera setting change and image reproduction display data that is based on image data stored in a memory device or on shooting image data correlated to the operating mode selected via the selecting device as the first image and/or the second image.

3. A camera according to claim 1, wherein:
    the display control device controls the display device so as to keep at least one of the first image and the second image in a non-display state.

4. A camera according to claim 1, further comprising:

an operating member disposed at an upper surface of the camera, wherein:

the first image and the second image displayed by the display device are observed at an upward angle relative to the display device and from a direction along a normal line to the display device, respectively.

5. A camera according to claim 1, further comprising:

an operating member disposed at an upper surface of the camera, wherein:

the first image and the second image displayed by the display device are observed from at least two different directions, wherein the at least two different directions comprise an upward angle relative to the display device, a direction along a normal line of sight to the display device and a downward angle relative to the display device.

6. A camera according to claim 5, wherein:

the display control device controls the display device to display an image observed from an observing direction other than the direction extending along the normal line of sight for the display device by enlarging the image along a direction parallel to a plane that contains the direction along the normal line of sight to the display device and the observing direction.

7. A camera according to claim 6, wherein:

the display control device increases an enlargement magnification factor for the image as a distance from an observation position increases.

8. A camera according to claim 6, wherein:

the display control device controls the display device to display the image in a further enlargement by ensuring that as an angle formed by the direction along the normal line and the observing direction on a display screen at the display device increases, a display magnification factor along a direction perpendicular to the plane also increases.

9. A camera according to claim 8, further comprising:

a detector that detects an angle of inclination corresponding to an attitude of the camera, wherein:

the display control device raises at least one of the enlargement magnification factor for the image along the direction parallel to the plane and the display magnification factor for the image along the direction perpendicular to the plane in correspondence to the angle of inclination detected via the detector.

* * * * *